US 008856207B2

(12) United States Patent
Owen et al.

(10) Patent No.: US 8,856,207 B2
(45) Date of Patent: Oct. 7, 2014

(54) CLICK DETECTION METHOD, APPARATUS AND SYSTEM

(75) Inventors: Russell Owen, Waterloo (CA); Michael Brown, Kitchener (CA); Herbert Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 615 days.

(21) Appl. No.: 12/170,750

(22) Filed: Jul. 10, 2008

(65) Prior Publication Data

US 2009/0112978 A1 Apr. 30, 2009

Related U.S. Application Data

(60) Provisional application No. 60/982,833, filed on Oct. 26, 2007.

(51) Int. Cl.
*G06F 15/16* (2006.01)
*H04L 29/06* (2006.01)
*G06Q 30/02* (2012.01)

(52) U.S. Cl.
CPC ............ *H04L 63/0421* (2013.01); *G06Q 30/02* (2013.01)
USPC .......................................... 709/203; 713/163

(58) Field of Classification Search
CPC ........................... H04L 63/0421; G06Q 30/02
USPC ........................................................ 709/203
See application file for complete search history.

(56) References Cited

U.S. PATENT DOCUMENTS

| 5,117,351 | A  | * | 5/1992  | Miller ....................................... 1/1 |
| 5,940,854 | A  | * | 8/1999  | Green et al. ..................... 711/112 |
| 6,463,533 | B1 | * | 10/2002 | Calamera et al. ............. 713/163 |
| 7,310,525 | B2 | * | 12/2007 | Takase et al. ............... 455/435.2 |
| 7,542,468 | B1 | * | 6/2009  | Begley et al. .................... 370/389 |
| 7,546,335 | B2 | * | 6/2009  | Moeller et al. ................ 709/201 |
| 7,568,033 | B2 | * | 7/2009  | Aoyagi ........................ 709/226 |
| 2002/0116531 | A1 |   | 8/2002  | Chu |
| 2002/0174364 | A1 |   | 11/2002 | Nordman et al. |
| 2003/0120608 | A1 |   | 6/2003  | Pereyra |
| 2004/0172535 | A1 |   | 9/2004  | Jakobsson et al. |
| 2004/0254894 | A1 |   | 12/2004 | Tsuei et al. |
| 2005/0132068 | A1 | * | 6/2005  | Rajamony ...................... 709/228 |
| 2005/0273388 | A1 | * | 12/2005 | Roetter ........................... 705/14 |
| 2006/0004772 | A1 |   | 1/2006  | Hagan et al. |
| 2006/0116117 | A1 | * | 6/2006  | Takase et al. ................. 455/420 |

(Continued)

FOREIGN PATENT DOCUMENTS

| CA | 2258036 A     | 12/1997 |
| WO | 03105396 A1   | 12/2003 |
| WO | 2004104738 A2 | 12/2004 |

OTHER PUBLICATIONS http://noclickfraud.com/.

(Continued)

*Primary Examiner* — Arvin Eskandarnia
(74) *Attorney, Agent, or Firm* — Perry + Currier Inc.; Kristjan Spence

(57) ABSTRACT

A click detection method, apparatus and system is provided. An embodiment includes a method that receives a request from a client destined for a server and a unique identifier for the client. The method of the method also includes generating a representation of the unique identifier, and forwarding the unique identifier and the request to the server.

26 Claims, 13 Drawing Sheets

(56) References Cited

U.S. PATENT DOCUMENTS

| | | |
|---|---|---|
| 2006/0178994 A1 | 8/2006 | Stolfo et al. |
| 2007/0061586 A1* | 3/2007 | Golubchik et al. ............ 713/178 |
| 2007/0074169 A1 | 3/2007 | Chess et al. |
| 2007/0143475 A1 | 6/2007 | Daigle |
| 2008/0092228 A1* | 4/2008 | Baum ............................ 726/13 |
| 2008/0288614 A1* | 11/2008 | Gil et al. ........................ 709/220 |
| 2009/0019282 A1* | 1/2009 | Arditti et al. .................. 713/168 |
| 2009/0125719 A1* | 5/2009 | Cochran et al. ............... 713/171 |

OTHER PUBLICATIONS

International Search Report of PCT/CA2008/001278 dated Sep. 30, 2008.

Written Opinion of PCT/CA2008/001278.

Majumdar S et al: "Addressing Click Fraud in Content Delivery Systems" Infocom 2007. 26th IEEE International Conference on Computer Communications. IEEE, IEEE, PI LNKD-DOI: I0.II09/Infcom.2007.36, May 1, 2007, pp. 240-248, XP031093572.

European Patent Application No. 08 77 2882.0 Search Report mailed Oct. 6, 2010.

European Patent Application No. 08 772 882.0 Examination Report dated Mar. 1, 2011.

* cited by examiner

CLICK DETECTION METHOD, APPARATUS AND SYSTEM

FIELD

The present specification relates generally to telecommunications and more particularly relates to a click detection method, apparatus and system.

BACKGROUND

Charge-per-click web advertising is a form of advertising on the Internet whereby an advertisement with an associated link is displayed on a website, and a fee is charged to the advertiser by the entity hosting the website in the event that a visitor of the website actually clicks or otherwise selects the advertising link to open that link in the web browser. The fee charge is transparent to the visitor, but a record of the click is recorded so that payment can be effected from the advertiser to the host.

Click fraud (also known as click spam) occur when an adverting link on a web-page is selected, either automatically (e.g. by a script or computer program), or manually (e.g. by a user) in order to generate a charge-per-click, yet where there is in fact no interest in contents of the advertisement. More generally, click fraud also occurs in any situation where an artificial attempt is made to inflate web traffic to a particular website. Click fraud is the subject of some controversy and increasing litigation due to the advertising networks being a key beneficiary of the fraud.

In summary, click fraud creates fake requests to a web link to inflate traffic statistics or trigger revenue recognition. The usual method of detection is to record the Internet Protocol ("IP") address of the client. Repeated requests in a short time by the same client can be identified as spam. One problem is that this collection of IP addresses also allows profiling the activities of legitimate users. This profiling reduces the privacy of the legitimate user.

DETAILED DESCRIPTION OF THE EMBODIMENTS

Figure 1:
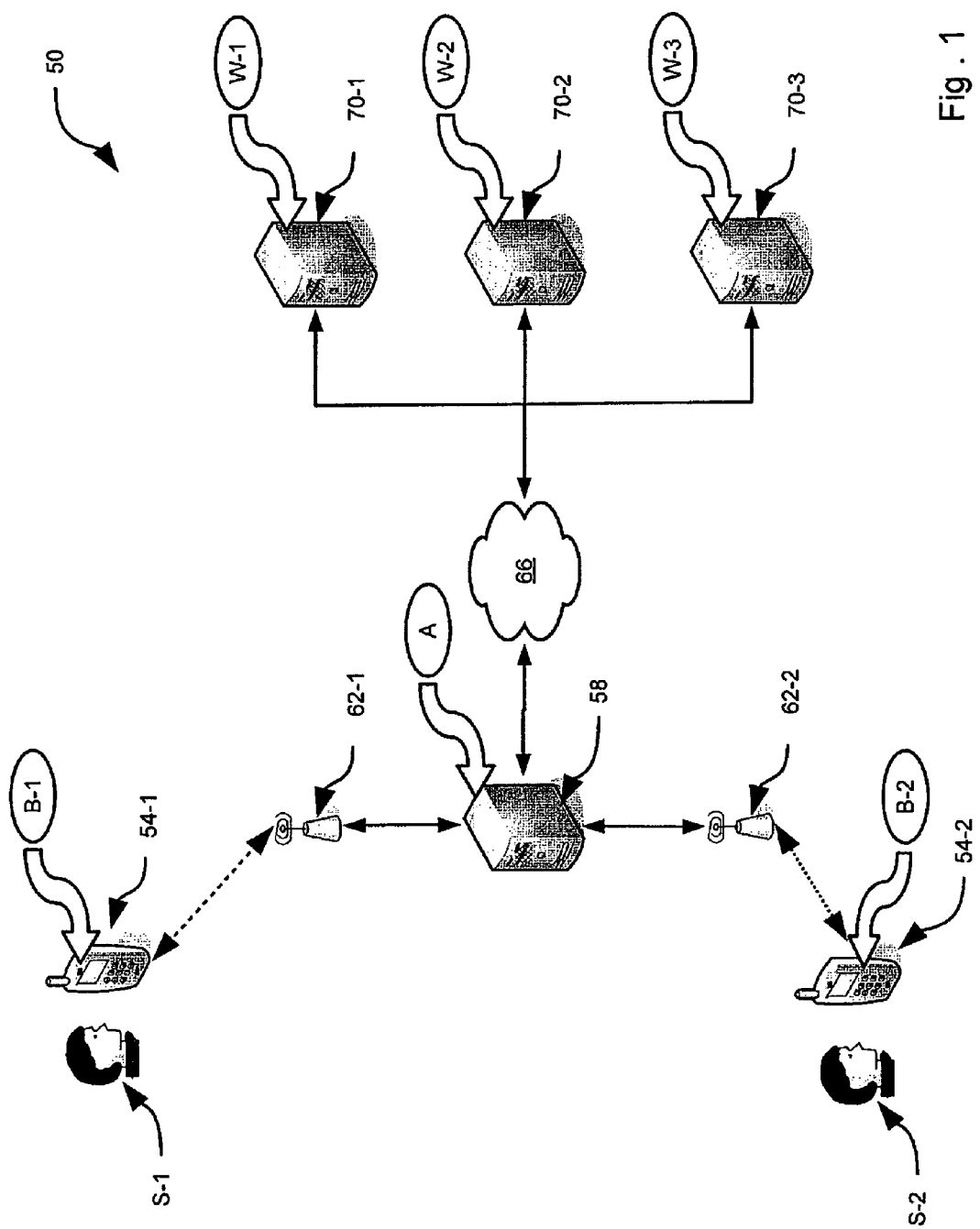
FIG. 1 is a schematic representation of a click system.

An aspect of the specification provides a method for modifying requests from a client device for a server comprising:
  receiving a request from the client device for the server;
  receiving a unique identifier for the client device; and,
  generating representation of the unique identifier.

The method can also comprise forwarding at least one of the representation and the request to the server.

The representation can be anonymous such that the unique identifier cannot be recovered from the representation. The representation can be generated using a hashing operation on the unique identifier to produce a message digest. The representation incorporates the message digest.

The representation can also be generated by: obtaining a numerical string representing a time period; concatenating the numerical string with the unique identifier; and, performing a hashing operation on the unique identifier to produce a message digest; the representation incorporating the message digest. The time period can be one of: one month, one week, one day, every twelve hours, and every hour. The time period can be one day.

The request can be for a web-page generated from a web-browser on the client device. The request can be generated by selecting a link on one web-page hosted on an additional server other than the server.

Another aspect of the specification provides a method for detecting requests from a client to a server comprising:
  receiving a request from a client;
  receiving a representation of a unique identifier of the client;
  applying at least one criterion based on the request and the representation to determine if the request is permitted;
  fulfilling the request if the at least one criterion determines that the request is permitted; and,
  denying the request if the at least one criterion determines that the request is not permitted.

The representation can be anonymous such that the unique identifier cannot be recovered from the representation. The method can be performed at an additional server other than the server.

The method can be performed at a server hosting a web-page that includes a link such that selection of the link generates the request.

The method can be performed at the server.

The criterion can include a maximum number of times that the request can be made in association with the representation, such that if the maximum number of times is exceeded then the request is denied.

The maximum number of times can be determined for a particular time period.

Another aspect of the specification provides a computer comprising a processor which connects to a persistent storage device and a volatile storage device via a bus. The processor is also connected to a network interface for communicating with a client device. The processor is configured to receive a request of a client device for a server. The processor is further configured to receive a unique identifier of the client device. The processor is further configured to generate a representation of the unique identifier and to forward the request and the representation for further processing by the server.

In the computer the representation can be anonymous such that the unique identifier cannot be recovered from the representation. The representation can be generated using a hashing operation on the unique identifier to produce a message digest. The representation incorporates the message digest.

The processor can be further configured to generate the representation by concatenating a numerical string representing a time period with the unique identifier, and performing a hashing operation on the unique identifier to produce a message digest. The final representation incorporates the message digest.

The time period is one of: one month, one week, one day, every twelve hours, and every hour. The time period can be one day.

The request can be for a web-page generated from a web-browser on the client device.

The request can be generated by selecting a link on one web-page hosted on an additional server other than the server.

The computer can be independent of the client and the server or the computer can be the same as the client.

Another aspect of the specification provides a method of processing requests comprising:
receiving a request and a unique identifier from a client device;
generating a representation of the unique identifier; and,
recording the representation and the request.

The method can further comprise determining if the recording step is performed less than a predetermined number of times and in which case a charge to an entity hosting the content associated with the request is generated.

Another aspect of the specification provides a method of processing requests comprising:
receiving a request for content and a unique identifier at a service provider engine from a client device;
generating a representation of the unique identifier at the service provider engine;
forwarding the request for content and the representation to a first content server; the content being hosted on an additional content server other than the first content server; and,
recording the representation and the request for content at the first content server.

The method can further comprise determining if the recording step is performed less than a predetermined number of times, in which case a charge to an entity hosting the content associated with the request is generated.

The method can further comprise returning a redirect address to the service provider engine from the first content server. The redirect address includes an identifier for the content.

The method can further comprise returning the redirect address to the client device from the service provider engine.

The method can further comprise using the redirect address to connect with the additional content server.

Referring now to FIG. 1, a click detection system is indicated generally at 50. System 50 comprises a plurality of client devices 54-1, 54-2, which are collectively referred to herein as client devices 54 and generically as client device 54. (This nomenclature is used elsewhere herein.) System 50 also comprises a service provider engine 58 that serves each client device 54 via an access point 62 respective to each client device. System 50 also comprises a network 66 which interconnects service provider engine 58 with a plurality of servers 70.

In general terms, system 50 is configured such that client devices 54 can access and otherwise interact with servers 70 via the infrastructure that lies therebetween. In a present exemplary embodiment network 66 is the Internet, and servers 70 are configured to host web-pages W, and client devices 54 are configured to execute web-browsers B which can be used to browse web-pages W. As will be explained in greater detail below, engine 58 is also configured to implement an anonymizer application A that anonymizes the identity of client 54 associated with requests for web-pages W on servers 70 from web-browsers B on clients 54. Anonymizer application A renders the identity of each client 54 substantially anonymous such that servers 70 and their respective web-browsers B can track requests from clients 54, and optionally fulfill those requests.

Figure 2:
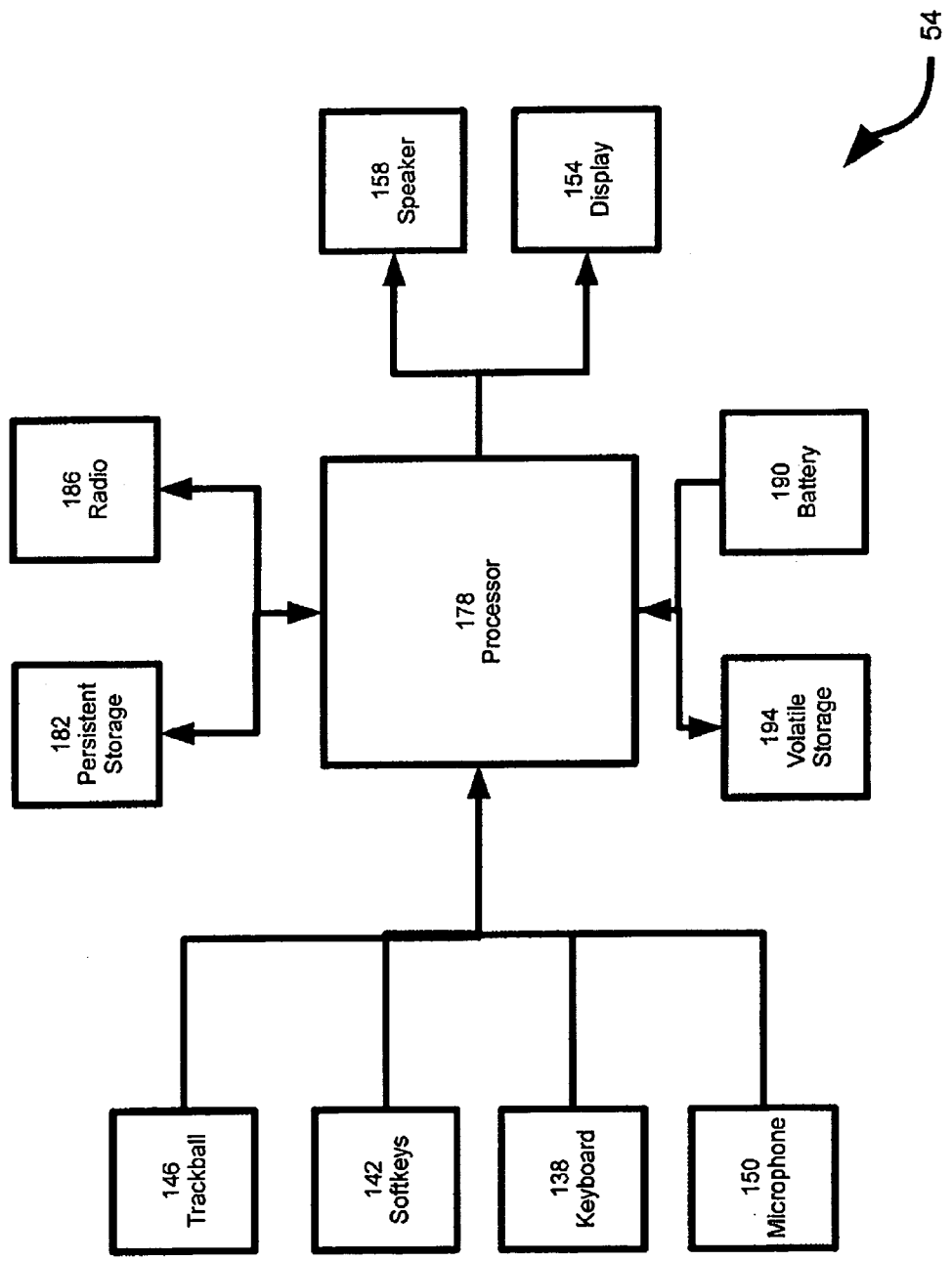
FIG. 2 is a schematic block diagram of a client device from FIG. 1.

The structure and features of each client device 54 can vary. However, to provide an example, FIG. 2 shows a block diagram representing exemplary components of client device 54. Client device 54 thus includes a processor 178 which interconnects input devices of client device 54 (e.g. a trackball 146, soft keys 142, keyboard 138, and a microphone 150) and output devices of client device 54 (e.g. a speaker 158, a display 154 and a camera flash 166). Processor 178 is also connected to a persistent storage device 182. As discussed earlier, persistent storage device 182 can be implemented using flash memory or the like, and/or can include other programmable read only memory ("PROM") technology and/or can include read only memory ("ROM") technology and/or can include a removable "smart card" and/or can comprised combinations of the foregoing.

Device 54 also includes a wireless radio 186 disposed that connects wirelessly to access point 62 to provide wireless email, telephony and web-browsing functionality of client device 54. Client device 54 also includes a battery 190 which is typically rechargeable and provides power to the components of client device 54. In FIG. 2, for simplicity battery 90 is only shown connected to processor 78, but it will be understood that battery 190 is connected to any component (e.g. radio 188 and display 154) within client device 54 that needs power to operate. Client device 54 also includes volatile storage 194, which can be implemented as random access memory ("RAM"), which can be used to temporarily store applications and data as they are being used by processor 178. Collectively, one can view processor 178, volatile storage 194 and persistent storage device 182 and as a microcomputer. It is now apparent that device 54 is based on the structure and functionality of a portable wireless device such as a Blackberry™ from Research in Motion Inc., of Waterloo Canada, but it is to be stressed that this is a purely exemplary client device, as client device 54 could also be based on any type of client computing device including portable wireless devices from other manufacturers, desktop computers, laptop computers, cellular telephones and the like.

The microcomputer implemented on client 54 is thus configured to store and execute the requisite BIOS, operating system and applications to provide the desired functionality of client 54, including, by way of non-limiting example, webbrowsers B.

Figure 3:
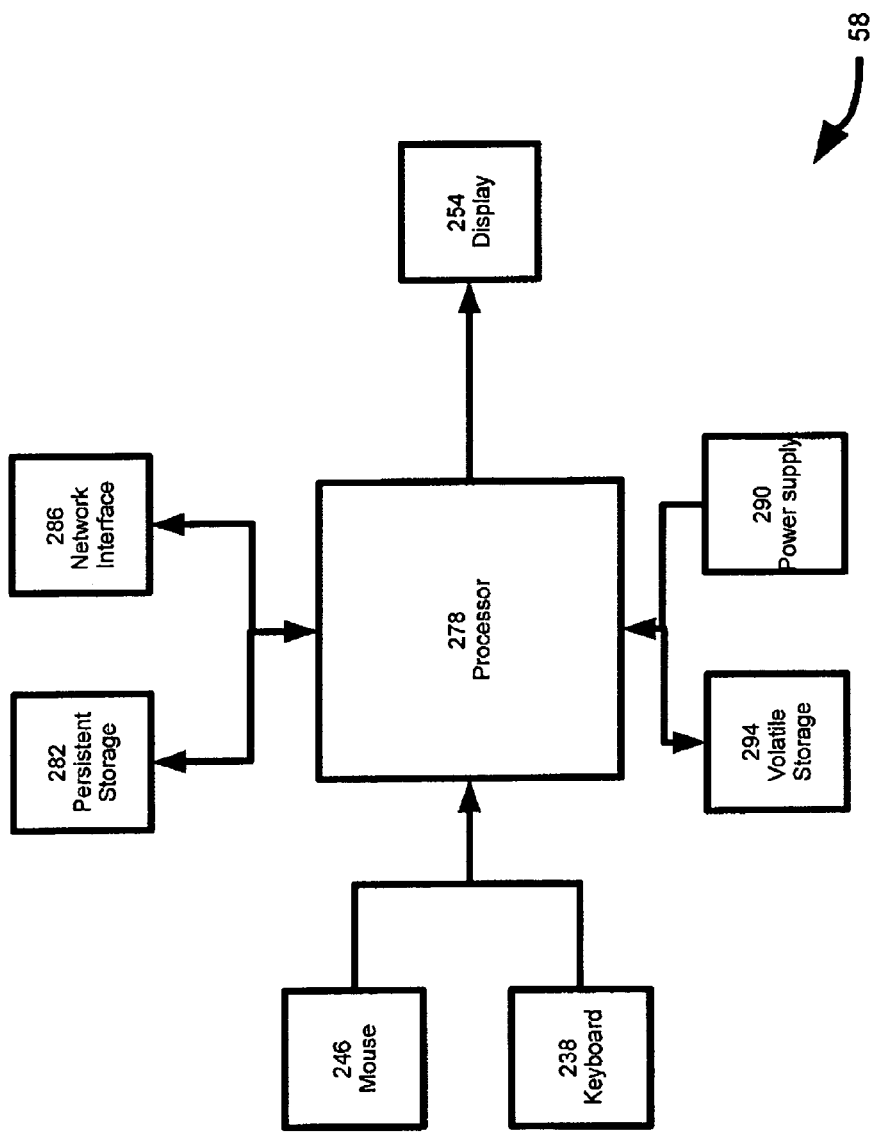
FIG. 3 is a schematic block diagram of a server from FIG. 1.

The structure and features of each engine 58 and server 70 can also vary. However, to provide an example, FIG. 3 shows a block diagram representing exemplary components of engine 58. Such components in FIG. 3 can also apply to servers 70, even though no figure for servers 70 is shown. Engine 58 thus includes a processor 278 which interconnects input devices, if present, (e.g. a mouse 246 and keyboard 238) and output devices, if present, (e.g. a display 254). Processor 278 is also connected to a persistent storage device 282. As discussed earlier, persistent storage device 282 can be implemented using flash memory or the like, and/or can include other programmable read only memory ("PROM") technology and/or can include read only memory ("ROM") technology and/or can include a removable "smart card" and/or can comprised combinations of the foregoing.

Engine 58 also includes a network interface 286 that connects to access point 62 and to network 66 as part of a networking pathway between network 66 (and by extension each server 70) and each client device 54. Engine 58 also includes volatile storage 294, which can be implemented as random access memory ("RAM"), which can be used to temporarily store applications and data as they are being used by processor 278. Collectively, one can view processor 278, persistent storage 278 and volatile storage device 294 and as a microcomputer. It is now apparent that device 54 is based on the structure and functionality of a commercial server such as a Sun Fire X4450 Server from Sun Microsystems Inc., of Palo Alto, USA, but it is to be stressed that this is a purely exemplary server, as engine 58 (and servers 70) could also be based on any type of server computing device including from other manufacturers.

The microcomputer implemented on engine 58 is thus configured to store and execute the requisite BIOS, operating system and applications to provide the desired functionality of engine 58, including, by way of non-limiting example, the storage and execution of anonymizer application A.

The microcomputers implemented on each server 70 are thus configured to store and execute the requisite BIOS, operating system and applications to provide the desired functionality of servers 70, including, by way of non-limiting example, the hosting of each web-page W and related processing of requests for such pages from web-browsers B.

Access points 62 can be based on wireless base stations found in the core cellular telephone network infrastructures such as, by way of non-limiting example, Global System for Mobile communication ("GSM") and its variants and successors and Code Division Multiple Access ("CDMA") and its variations and successors. Access points 62 can also be based on, in addition to or in lieu of the foregoing, wireless access points found in wireless area networks such as, by way of non-limiting example, Institute of Electrical and Electronic Engineers (IEEE) standard 802.11 and its variants and successors and Bluetooth™ and its variations and successors. In general access point 62 is any infrastructure that provides a link between clients 54 and engine 58, and such infrastructure can be also be hybrid infrastructures, (supporting, for example, both GSM and IEEE 802.11) depending on the type of wireless link between each access point and each client 54—also of course depending on the wireless link functionality of each client 54.

It should now be understood that much of the elements used to implement particular network infrastructure, (e.g. GSM, CDMA, IEEE 802.11, Bluetooth etc.) are not shown and are intended to be implicit within the various links between access point 62 and network 66 and elsewhere in system 50 as needed. Further, the exact placement of engine 58 and anonymizer application A is not particularly limited. For example engine 58 can be eliminated and anonymizer application A can be implemented on either client 54 itself, or on each server 70. Indeed, it can be desired to implement anonymizer application A as part of existing network infrastructure elements rather than providing a separate server. In general, variations on system 50 are contemplated—for example it is contemplated that a direct connection can exist between access points 62 and server 70 so that engine 58 can be bypassed. While not part of the present embodiment, it will also become apparent that system 50 can also be modified to operate with wired links in lieu of, or in addition to, the wired links, and in such case one or both access points 62 or additional access points can be wired access points so as to provide wired access to network 66 for non-wireless clients 54. These and other variants become more apparent from a review of this entire specification.

Figure 4:
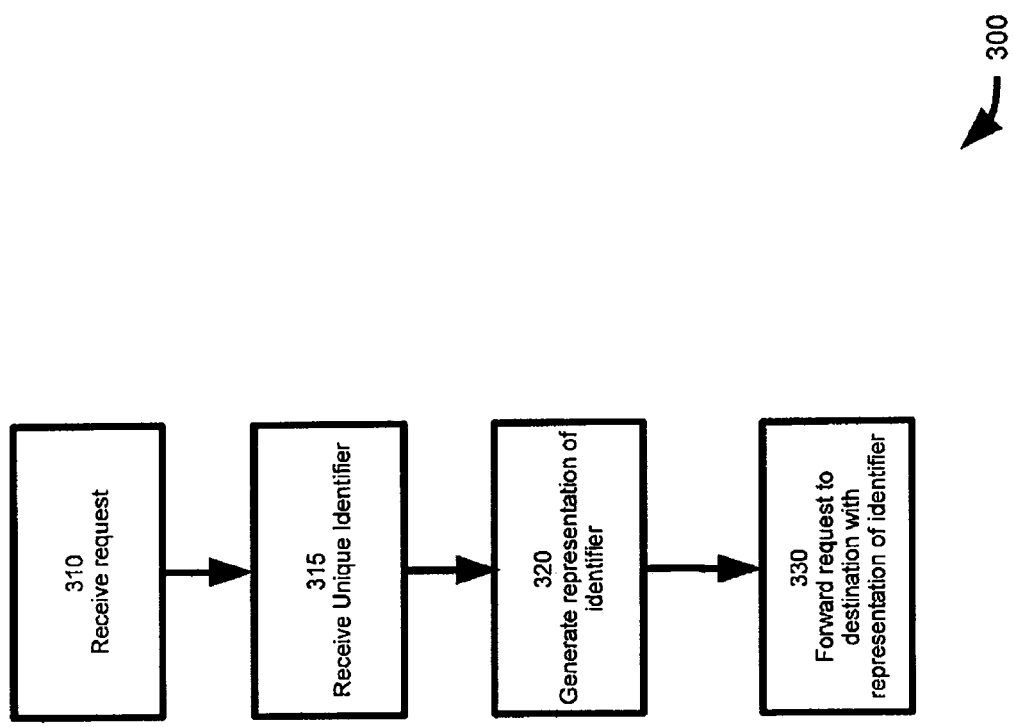
FIG. 4 is a flow-chart depicting a method of anonymizing requests.

Referring now to FIG. 4, a method for anonymizing requests is represented in the form of a flow-chart and indicated generally at 300. It is to be understood that method 300 can be performed using system 50, and in particular that method 300 represents a possible implementation for anonymizer application A. On this basis method 300 will be described as it can be performed using system 50. However, it is also to be understood that method 300 and system 50 can be varied.

Figure 5:
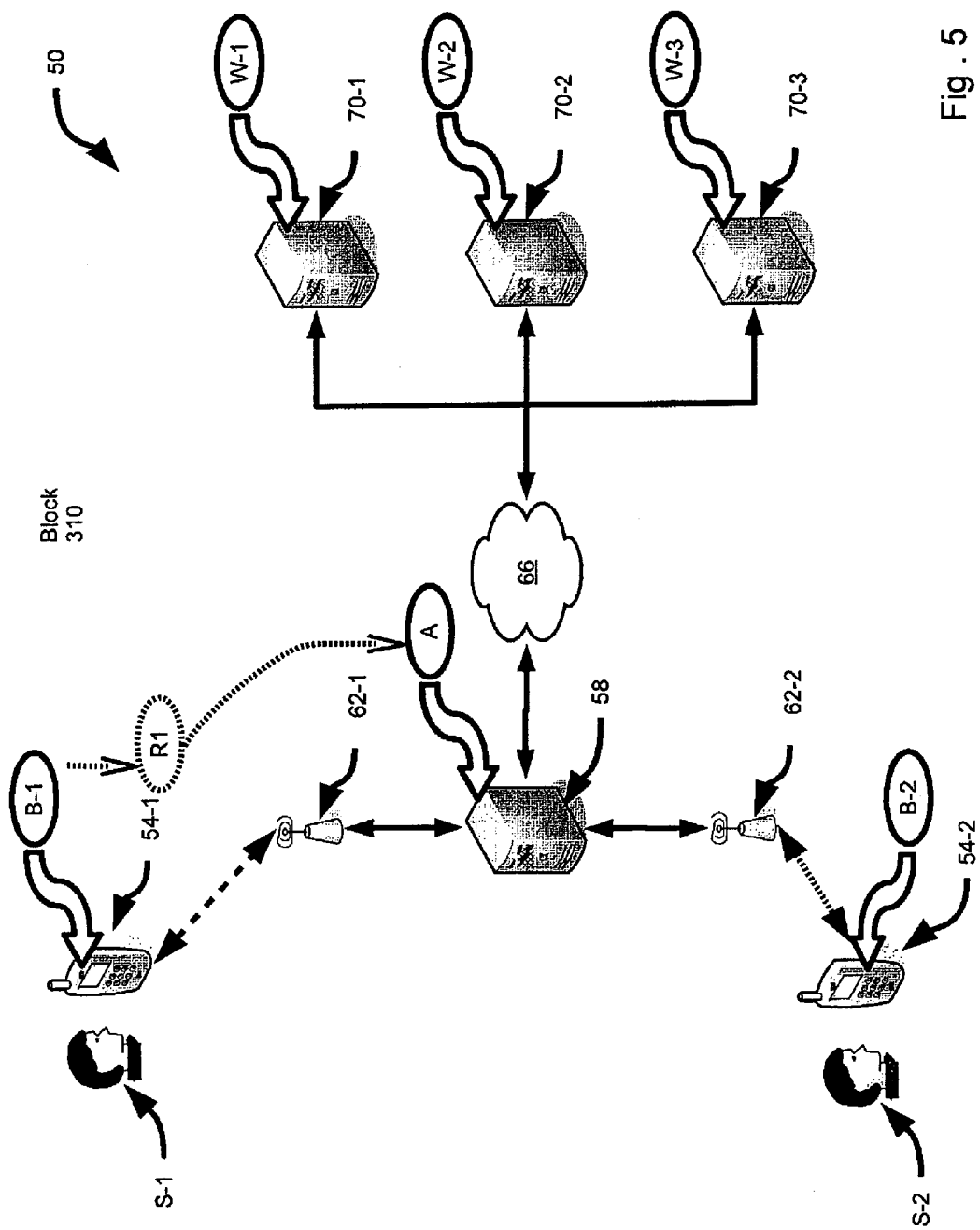
FIG. 5 shows the system of FIG. 1 during exemplary performance of block 310 from FIG. 4.

Beginning at block 310, a request is received. In the context of system 50, such a request is generated by web-browser B-1 within client device 54-1 and is received within anonymizer application A within engine 58. Block 310 is represented in FIG. 5 as a request R1 is shown in an oval and sent to engine 58 where it is received by anonymizer application A. Table I provides exemplary, and of course highly simplified, representation of contents of request R1. It is contemplated, though by no means required, that such a request is generated as a result of subscriber S-1 requesting to view a web-link in web-browser B-1 that is associated with one of servers 70.

TABLE I

Exemplary contents of request R1

| Unique Address | Internet Protocol ("IP") Address | Requested Item |
|---|---|---|
| 54-1 | 111.111.111.111 | W-1 |

Explaining Table I in greater detail, the column entitled "Unique Address" refers to an identifier that is unique to client device 54-1. Such unique identifiers are not particularly limited, and can be based on, for example, a media access control ("MAC") address, a device serial number, an International Mobile Equipment Identity ("IMEI"), or, in the specific case of a Blackberry™ device, the PIN (personal identification number) of the device. In Table I, the reference "54-1" is used which is of course the same of the reference "54-1" to label client device 54-1, but the use of 54-1 is simply representative of any unique identifier associated with a particular client device 54-1.

The column entitled "IP address" in Table I refers to the address within network 66 used to identify traffic that is destined for or originating from client 54-1. Those skilled in the art will appreciate that client 54-1 will, in the majority of cases, be assigned such an IP address on a dynamic basis such that client 54-1 will have a new IP address each time client 54-1 connects to access point 62-1, and in any event will almost certainly be assigned a new IP address when client 54-1 "roams" so as to connect to access point 62-2. Thus, while it is possible for the IP address in Table I to be static each time and therefore serve as a unique identifier for client 54-1, it is not common and therefore the IP address in Table 1 is not a reliable method of uniquely identifying client 54-1 (or any other client 54 on network 66). Of course, where network 66 is not based on the Internet then column two of Table I would include the appropriate type of network address corresponding to that type of network.

The column entitled "Requested Item" in Table I refers to the web page, link, or other hosted service on a specific server 70 that is being requested by browser B-1 on client 54-1. In a practical implementation, the "Requested Item" could comprise a web-page address within network 66 used to identify a web-page W hosted by a particular server 70, such an address typically being of the form: http://www.[domain].

[topleveldomain] where [domain] refers to a particular text string and [topleveldomain] refers to one of the top level domains of the Internet such as ".com", ".net", ".org", and the like. A well-known exemplary address is http://www.ebay.com, that can in turn be resolved into an IP address by known network infrastructure inherent to network 66. In the specific example of Table I, the "Requested Item" refers to "W-1" to represent web-page W-1 hosted by server 70-1.

Referring again to FIG. 4, at block 315 a unique identifier is received. In the example discussed above, block 315 is inherent within block 310, as the first column of Table I includes the unique identifier for the client device 54 that is making the request R1. In this case the unique identifier is "54-1" and it is received by anonymizer application A, or in this case extracted from Table I.

At block 320, a representation of the unique identifier from block 310 is generated. In the present embodiment, it is contemplated that the generated identifier should result in a new identifier that anonymizes the actual source of request R1, although in variations such a representation need not anonymize but simply be different than R1.

Figure 6:
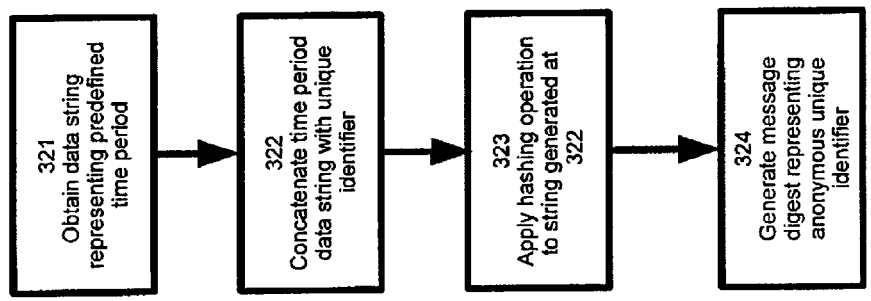
FIG. 6 is a flow-chart depicting a method of performing one of the blocks of the method of FIG. 4.

FIG. 6 shows a series of blocks that can be used to perform block 320 indicated generally as method 320Z. In method 320Z it is desired to generate an anonymous unique identifier that will not persist beyond a predefined time period. In other words, where method 320Z is used to implement block 320, then method 300 will need to be repeated in order to generate a new anonymous unique identifier for a given client 54 beyond the predefined time period.

Exemplary predefined time periods include one month, one week, one day, every twelve hours, and every hour. In a present embodiment for method 320Z a time period of one day is selected. This time period is selected in the present embodiment as it is presently believed to reflect a meaningful period for detecting repetitive clicks from a single client device 54.

Thus, according to method 320Z, at block 321 a data string is obtained that represents the predetermined time period. In the present example, anonymizer application A will obtain a data representation in the form of a numerical string that represents a day. For example, if the date on which method 300 is performed happens to be Nov. 17, 2000, then the numerical string could be "20001117", where the first four digits represent the year, the second two digits represent the month, and the final two digits represent the unique day. This means that the time period is automatically reset on the following day. Where other time periods are selected than a numerical string that identifies the performance of method 300 during that time period can be generated using similar techniques.

As part of performance of block 320, at block 322 the numerical string representing the predefined time period as indicated above is concatenated with the unique identifier received at block 315. Accordingly, this concatenation results in the string "54120071117", where the first three digits "541" represent 54-1 (as in, client device 54-1) and the remaining digits represent the date string 20071117 discussed above. Those skilled in the art will now recognize that where a MAC address or Blackberry™ PIN is used, the resulting concatenated string will be longer in length.

Also as part of the performance of block 320, the concentrated numerical string is applied through a secure hashing operation in order to generate a message digest of the concentrated numerical string. This is represented as blocks 323 and 324 in method 320Z. An exemplary secure hashing operation is the SHA1 operation, which takes a message of less than two-hundred-and-sixty-four bits in length and produces a one-hundred-and-sixty-bit message digest. The type of hashing operation, and the length of the concatenated string against which the hashing operation is performed, are each chosen to as much as possible generate unique anonymous identifiers—and if not absolutely unique, then to have a sufficient level of uniqueness such that the there is a substantially low statistical probability that two client devices 54 that attempt to access a single server 70 have the same anonymous identifier. At block 324, the resulting message digest is produced. For exemplary purposes, it will be assumed that the resulting message digest is: "AB12" expressed in hexadecimal.

Thus as method 320Z ends, method 300 resumes at block 330, at which point the request from block 310 is modified and forwarded on towards the destination address of the request, except in modified form so as to exclude the unique identifier from block 315 and to include the anonymous identifier from block 320. Table II shows a modified version of request R1, represented as request R1' that reflects the request generated at block 330. Table II thus provides exemplary contents of modified request R1'.

TABLE II

Exemplary contents of request R1'

| Anonymous Address | Internet Protocol ("IP") Address | Requested Item |
|---|---|---|
| AB12 | 111.111.111.111 | W-1 |

Figure 7:
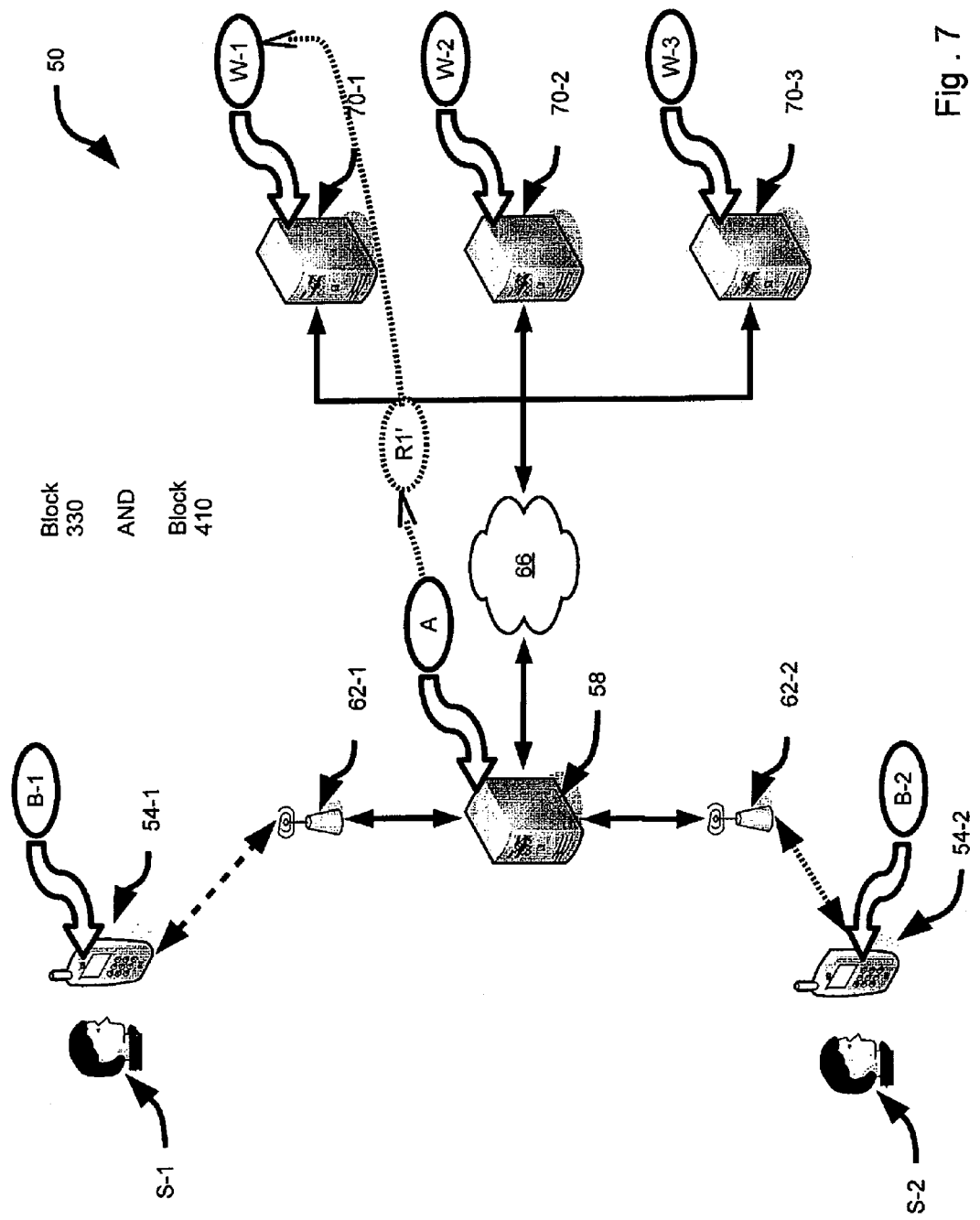
FIG. 7 shows the system of FIG. 1 during exemplary performance of block 330 from FIG. 4.

The performance of block 330 is represented in FIG. 7, as request R1' is forwarded from engine 58 to server 70 so that the request for web-page W-1 can be processed. Server 70 can process the request in the usual manner and ignore the presence of anonymous address altogether in the request, or server 70 can utilize the anonymous address.

Figure 8:
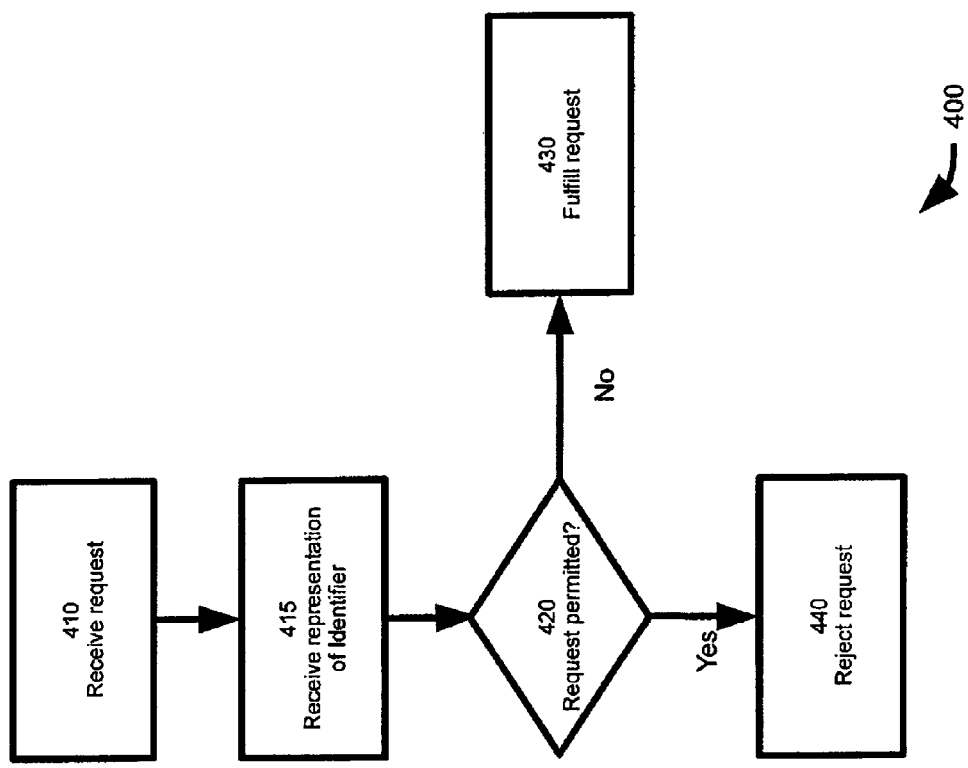
FIG. 8 is a flow-chart depicting a method of detecting clicks.

Referring now to FIG. 8, a click detection method is represented in the form of a flow-chart and indicated generally at 400. It is to be understood that method 400 can be performed using system 50, and in particular that method 400 represents a possible implementation for one or more of servers 70 to make use of the results from method 300. On this basis method 400 will be described as it is implemented using system 50. However, it is also to be understood that method 300 and system 50 can be varied.

At block 410, a request is received. In a present example the received request is request R1' as generated at block 330. As represented in FIG. 7, server 70-1 will receive request R1' and therefore will receive the contents of Table II. At block 415, the representation of the identifier within the request R1' is also received. Block 415, in the present example, is implicit as the first column of Table II includes the anonymous identifier 'AB12'.

At block 420, a determination is made as to whether the request received at step 410 is to be permitted. If 'yes' method 400 moves to block 430 and the request is fulfilled. Fulfillment of the request involves making web-page W-1 available to web-browser B-1 via network 66 in the usual manner, so that subscriber S-1 can browse web-page W-1. If the determination at block 420 is 'no', then method 400 moves to block 440 and the request is rejected. Block 440 can be fulfilled simply by deleting request R1' from the queue of requests in server 70-1 without any further action, as if request R1' had never been received.

The criteria to reach a 'yes' or 'no' determination at block 420 is not particularly limited and it is contemplated that each server 70 can be provided with different criteria according to the unique circumstances for that server 70. One criterion can be based on whether a maximum number of requests from the same client have been received within a predefined time period. If fewer than a predefined maximum number of requests have been received then a 'yes' determination is made at block 420 and method 400 advances to block 430 to fulfill the request. However, if the predefined number of maximum requests have been received then a 'no' determination is made at block 420 and method 400 advances to block 440 where the request is rejected. This can be an effective means to detect and manage click fraud on an anonymous basis and thereby protect the true identity and privacy of all subscribers S.

Figure 9:
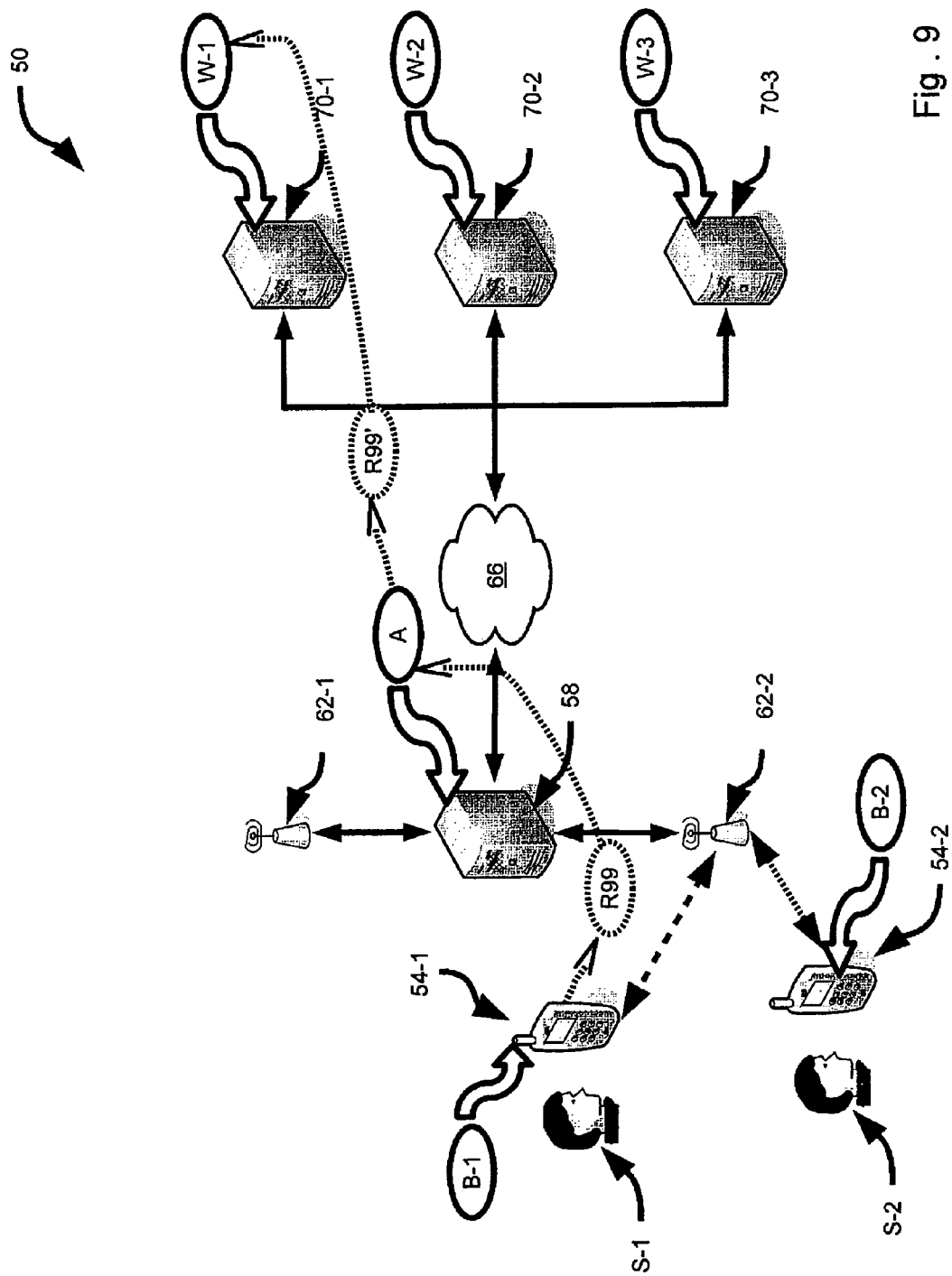
FIG. 9 shows the system of FIG. 1 during alternative exemplary operation of the system.

One advantage to the teachings herein is that anonymity is preserved, but click detection can occur even where a device 54 changes its IP address. Table III and FIG. 9 represent a ninety-ninth exemplary request from device 54-1, but in this case device 54-1 is communicating via access point 62-2 instead of access point 62-1. This means that the IP address for client device 54-1 has changed, but the anonymous address will not change.

TABLE III

Exemplary contents of request R99'

| Anonymous Address | Internet Protocol ("IP") Address | Requested Item |
|---|---|---|
| AB12 | 222.222.222.222 | W-1 |

Server 70, using method 400 will be able to determine that this is the ninety-ninth request for W-1 and, assuming that the predefined maximum number is less than ninety-nine, then server 70 will refuse the request by moving to block 440.

While the foregoing provides certain embodiments and exemplary performances thereof, it is to be understood that variations, combinations and subsets of the teachings herein are contemplated. For example, it is contemplated that anonymizer application A could be incorporated directly into each device 54 and thereby obviate the need for engine 58. However, this is not presently desired as a malicious subscriber could choose to "hack" device 54 in order to defeat the performance of anonymizer application A.

As another example, it is also contemplated that method 400 can operate at other locations in system 50. For example, method 400 can also be implemented on engine 58 and thereby prevent certain requests from ever reaching the server 70 respective to the requested web-page. It is also contemplated that method 400 can be implemented on the server that hosts the actual "link" that is the subject of the particular request. For example, assume that client device 54-1 is browsing web-page W-2 on server 70-2. Now assume that client device 54-1 selects a link on web-page W-2 that points to web-page W-1. Method 400 can be performed on server 70-2 to selectively prevent the request to web-page W-1 from ever being fulfilled.

As a still further variation, assume a certain number of requests to particular web-site are recorded for auditing purposes. Method 400 can be varied or supplemented so that when a certain number of requests are exceeded, the prior record of such requests is flagged to reflect that a maximum number of requests were exceeded.

While the foregoing discussion refers to requesting webpages on servers 70, its should also be understood that other types of requests from servers 70 are contemplated, including web-services such as Simple Object Access Protocol ("SOAP").

Figure 10:
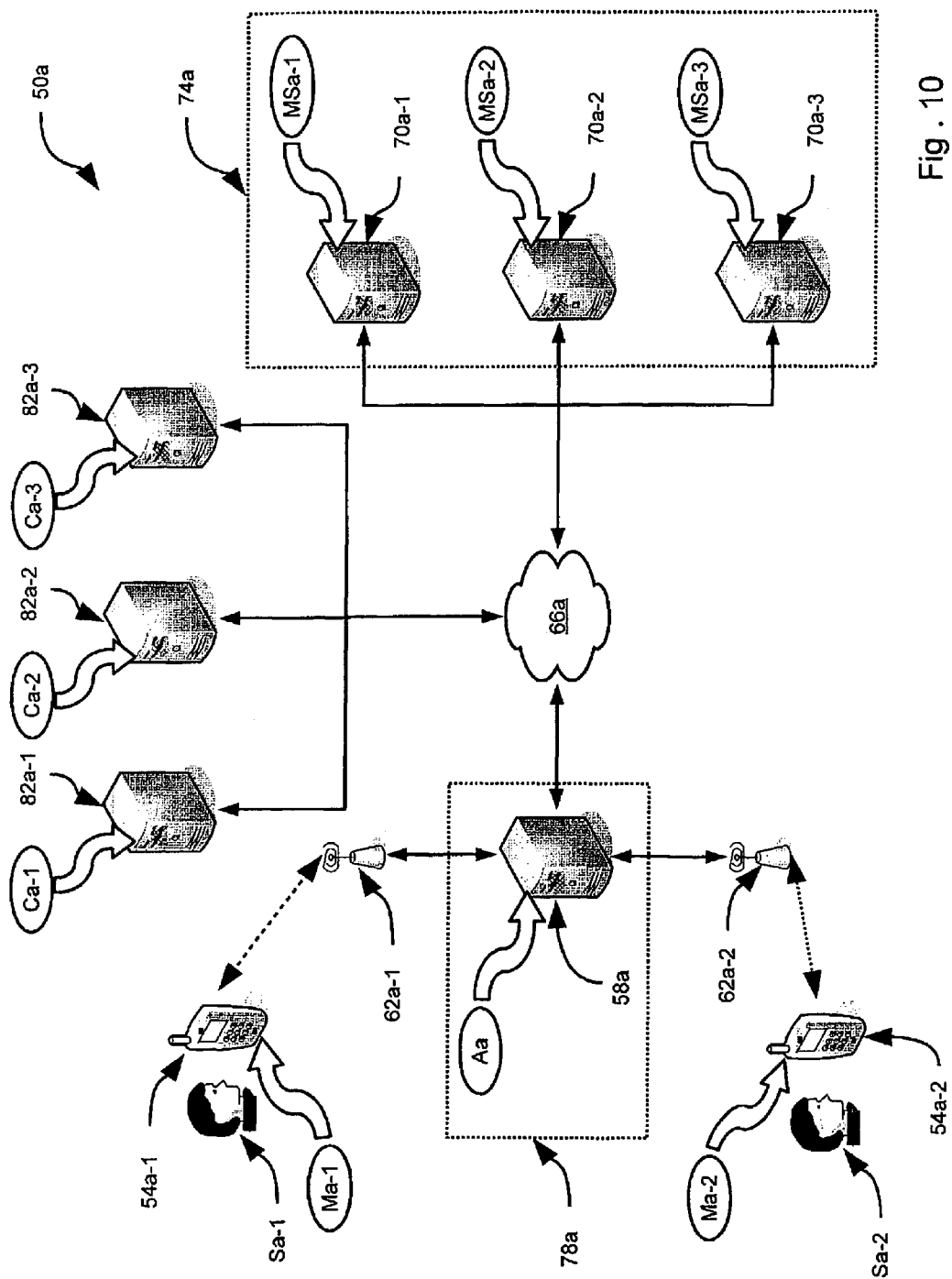
FIG. 10 is a schematic representation of another click system.

Without limiting the scope of the foregoing, further embodiments will now be discussed. In particular, with reference to FIG. 10, a click detection system in accordance with another embodiment is indicated generally at 50a. System 50a is a variation of system 50 and therefore like components in system 50a include like references to counterparts in system 50 except followed by the suffix "a".

Of note is that in system 50a, instead of web-browsers 50, client devices 54a include a mapping application Ma, which may be a mapping application accessed via a web-browser or another application such as Google Maps from Google Inc. 1600 Amphitheatre Parkway Mountain View, Calif. 94043. (Google is a trademark of Google Inc.) or Blackberry Maps from Research in Motion Inc, 295 Phillip Street, Waterloo, Ontario Canada (Blackberry is a trademark of Research in Motion Inc.). Thus at this point it should be apparent that variations within the scope of the specification include any any client device application that accesses web-pages or any other type of service or application that may be available on network 66a. As will be explained further below, mapping application Ma is configured to receive requests from subscriber S for mapping information, such as addresses or lists of business or the like.

Thus, just as each client device 54a includes mapping application Ma, likewise each server 70 can be configured to execute a corresponding mapping service MSa. Each mapping service MSa can therefore be configured to receive mapping requests from each mapping application Ma and process such requests accordingly to return mapping information to the mapping application Ma that originated the request.

In the present exemplary embodiment, servers 70 are owned by (or operated by or under the control of) a single entity or enterprise, which shall be referred to herein as a first content provider 74a. In this case, the content being provided by first content provider 74a is mapping information available from each mapping service MS. (It is to be emphasized this is a non-limiting example.)

Also in the present exemplary embodiment, service provider engine 58a is owned by (or operated by or under the control of another entity or enterprise which shall be referred to herein as transport provider 78a. Typically, though not necessarily, transport provider 78a is a different entity other than first content provider 74a. Transport provider 78a can be, for example: i) a carrier (e.g. AT&T, Sprint, Orange, Deutche Telecom) associated with each client device 54a that facilitates connection of client device 54a to network 66a; ii) an enterprise (e.g. an employer of each subscriber Sa, and which employer ultimately owns each each client device 54a and makes such devices available 54a to each subscriber Sa) associated with each client device 54a that facilitates connection of client device 54a to network 66a; iii) a portal service (e.g. American Online ("AOL") at www.aol.com, or MSN at www.msn.com); iv) a service provider (e.g. part of a Network Operation Center ("NOC") or Point of Interest ("POI") Server from Research in Motion Inc.) that connects each device 54a to network 66 in cooperation with a carrier that operates each access point 62a.

Also in the present exemplary embodiment, a plurality of additional content servers 82a are provided. Each additional content server 82a can be based on similar infrastructure as previously discussed in relation to engine 58 and servers 70. Each additional content server 82a is configured to maintain content Ca that can be delivered to and generated on client devices 54a, either through mapping application Ma or through another application (e.g. a web browser) on each client device 54a.

Figure 11:
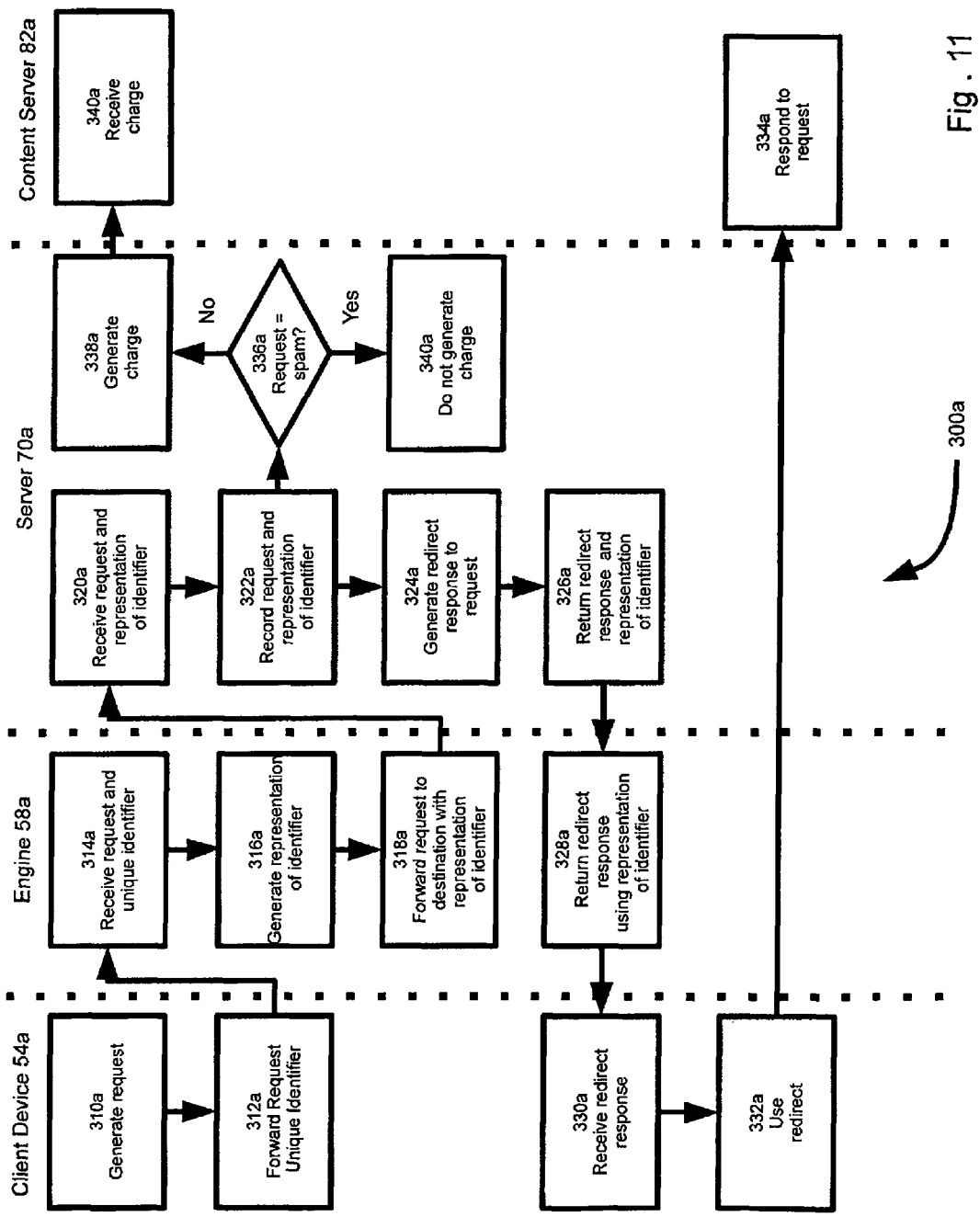
FIG. 11 is a flow-chart depicting a method of processing requests.

Referring now to FIG. 11, a method of processing requests is indicated generally at 300a. Method 300a can be implemented using system 50a or other modified version of system 50, though in general it is to be understood that variations to method 300a and/or system 50a are contemplated.

Before discussing method 300a, certain assumptions will be made. In particular, it will be assumed that client device 54a-1 has already made a request to server 70a-1 whereby mapping application Ma-1 has previously requested certain mapping information from mapping service MSa-1 and received a response to that request, the results of that response now being generated on the display of client device 54a-1. As a specific example, the previously requested certain mapping information can be based on the string: "restaurants near main street and king street in smithtown" provided to mapping application Ma-1, and the response from mapping service MSa-1 can take the form of the exemplary map 86a that is generated on the display of client device 54a-1 via mapping application Ma-1 shown in FIG. 12.

Figure 12:
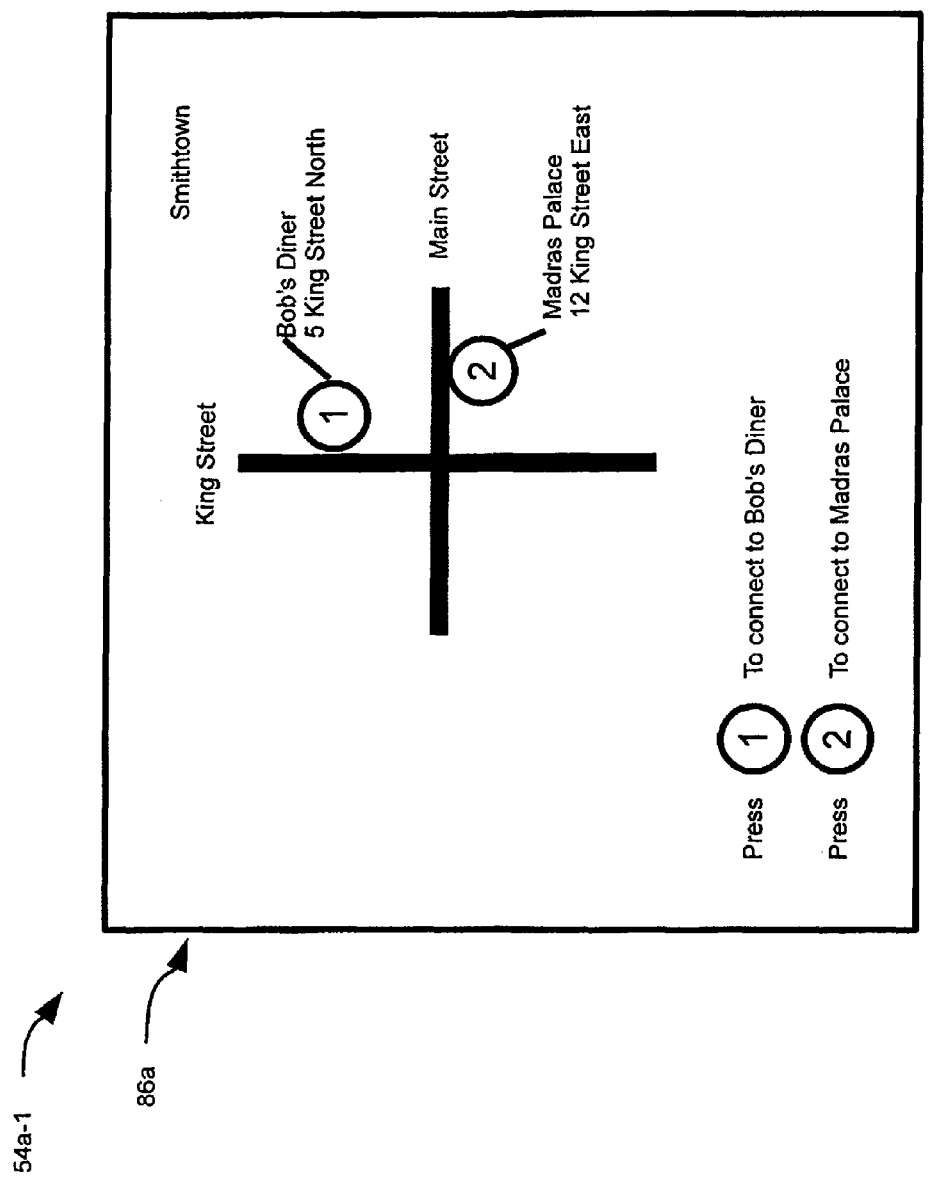
FIG. 12 is a representation of a map generated using a mapping application on the client device of FIG. 1.

Referring now to FIG. 12, map 86a shows a graphical representation of the intersection of King Street and Main Street in the Smithtown. Also shown on map 86a is the location of a first restaurant, Bob's Diner bearing the marker "1" and the location of a second restaurant, Madras Palace, bearing marker "2". At the bottom of map 86a options are provided whereby depressing the number "1" on keyboard 138 of client device 54a will cause client device 54a to be connected to Bob's Diner, while depressing the number "2" on keyboard 138 of client device 54a will cause client device 54a to be connected to Madras Palace. The depressing of either number "1" or number "2" on keyboard 138 client device 54a will constitute a "request" of the type contemplated at step 310a of method 300a in FIG. 11. Assume also that content server 82a-1 is hosted by Bob's Diner and that content Ca-1 is a web-page with particulars about Bob's Diner, and that content server 82a-2 is hosted by Madras Palace and that content Ca-2 is a web-page with particulars about Madras Palace.

Before proceeding further, it should be emphasized that the nature of the "connection" being offered via map 86a is not particularly limited. For example, selection of "1" could reflect connection to the above-mentioned web-page hosted by Bob's Diner as content Ca-1 (e.g. www.bobsdinerinsmithtown.com) which is accessed via a web-browser on client device 54a, or a connection to Bob's Diner via a telephone number (e.g. a public switched telephone network number such as +1-555-555-5555 or an Internet telephony identity such as a Skype ID) by invoking a telephony application on client device 54a (although the telephony example is not shown in the Figures). In the present discussion of the exemplary embodiment, the connection will be via web-browser.

Referring again to FIG. 11, at block 310a a request is generated. In the present exemplary embodiment, the request is formed in response to the depressing of the number "1" by subscriber Sa-1 on client device 54a-1 in response to viewing map 86a in FIG. 12. At block 312a, the request from block 310a is forwarded along with the unique identifier for client device 54a-1 to engine 58a.

At block 314a, the request and the unique identifier from block 312a is received at engine 58a. At block 316a, a representation of the unique identifier received at block 314a is generation. It will now be understood that such generation can be performed using any desired technique, such method 320Z shown in FIG. 6, or variants thereof that will now occur to those skilled in the art. At block 318a, the request is forwarded to the intended destination (in this example, server 70a-1) along with the representation generated at block 316a.

At block 320a, the request and representation of the identifier forwarded from block 318a is received at server 70a-1. At block 322a, a record of the request and representation of the identifier from block 320a is recorded. At this point method 300a branches, to both blocks 324a and block 336a. Block 336a and subsequent blocks will be discussed below.

At block 324a, a redirect response to the request from block 320a is generated. In the present example, the redirect response will include a network address on network 66a for server 82a-1 so that content Ca-1 that is hosted by Bob's Diner can be accessed. At block 326a the redirect response and the representation of the identifier will be returned to engine 58a. At block 328a, the redirect response will be returned to client device 58a. In performing block 328a, engine 58a will utilize the representation of the identifier generated at block 316a and received as part of performance of block 326a in order to perform pointing operation wherein the representation of the identifier used to point back to the original unique identifier for client device 54a-1. Thus, in fulfillment of block 328a, engine 58a will return the redirect response back to client device 54a-1, engine 58a having been able to locate the proper destination for the redirect response based on the above-mentioned pointing operation.

At block 330a, the redirect response is received from engine 58a at client device 54a-a. At block 332a, client device 54a-1 use the redirect response in order to connect directly to content server 82a-1 as hosted by Bob's Diner and obtain content Ca-1 hosted on content server 82a-1. In a typical embodiment, block 332a will be performed in a manner that is substantially automatic from the perspective of subscriber Sa-1, such that subscriber Sa-1 need take no further action other than to have generated the request at block 310a. In other words, it will (in a typical case) appear to subscriber Sa-1 that a direct connection has been made to content server 82a-1 as a result of having selected "1" on keyboard 138 of client device 54a-1, and subscriber Sa-1 will not be aware of blocks 312a through 330a that have occurred in between.

Returning now to block 336a, a determination is made as to whether the request at block 320a is spam or other non-authorized request. The determination at block 336a will based on a review of previous requests to ascertain whether a threshold number of identical requests associated with the same representation of the identifier have been made. In other words, block 336a will be based on whether block 320a has been performed a threshold number of times in association with the same request and the same representation of the identifier. If that threshold number has been exceeded, then a "yes" determination is made and at block 340a the request is deemed to have been spam and no charge is generated. If, however, the determination at block 336a is "no", then at block 338a a charge is generated and that charge is forwarded to content server 82a. The "charge" from block 338a is typically a fee that is charged by first content provider 74a to an enterprise or other entity (e.g. Bob's Diner) that owns or operates additional content server 82a-1, such a fee reflecting consideration for having directed subscriber Sa-1 to additional content server 82a-1 and thereby provide Bob's Diner an opportunity to directly sell services to subscriber Sa-1. Advantageously, however, the identity of subscriber Sa-1 is preserved throughout, thereby permitting first content provider 74a to screen for spam without prejudicing or compromising the privacy of subscriber Sa-1.

Further variations are contemplated. For example, blocks 336a, 338a and 340a can be a "bulk" operation, whereby charges are generated and sent only once during a predetermined time period or after a certain number of charges are accumulated.

As another example, it can be desired to configure system 50a so that each subscriber Sa can "opt-in" or "opt-out" of the anonymizing steps, so that a particular subscriber Sa can decide to permit the unique identifier of its client device 54a to be passed onto first content provider 74a and thereby permit first content provider 74a to track the behavior of subscriber Sa so that content generated by servers 70a can be specifically tailored or targeted according to the behavior of subscriber Sa. (This variation thus presumes that certain subscribers Sa will not be generating spam.) As a still further variation, subscriber Sa could decide to partially opt-in. A partial opt-in would involve allowing subscriber Sa to set the duration of the time period contemplated in relation to block 322 of method 320Z, so that first content provider 74a will have a limited time period in which to track usage patterns of subscriber Sa and target responses to subscriber Sa within those constraints.

As a still further variation, a plurality of engines 58a (or engines 58) could also be provided in order to handle large amounts or geographically disparate traffic. In this variation, it might be possible for a given subscriber Sa to generate multiple requests that may not be identified by first content provider 74a, but ultimately the number of requests that can be generated without detecting spam will be limited to the number of engines 58a.

As a still variation, engine 58a can be eliminated by having each device 54a generate the representation of the identifier. However, this variation can involve passing the actual unique identifier of client device 54a in addition to the representation of the identifier to servers 70a. This can allow the server 70a to return the request while at the same time allowing the server 70a to record the request, though ideally each server 70a will need to be configured to discard the actual unique identifier in order to actually provide desired privacy for each subscriber Sa.

As a still variation, engine 58a can still be utilized but each device 54a can generate the representation of the identifier.

As a still further variation, system 50a can be configured so that a charge is generated on behalf of transport provider 78a to at least one of first content provider 74a and the additional content provider hosting the server 82a to which traffic has been forwarded. The unique identifier or the representation of the identifier can be used by transport provider 78a, or the representation of the identifier can be used by first content provider 70a to screen for spam or other unauthorized requests and adjust charges accordingly.

Figure 13:
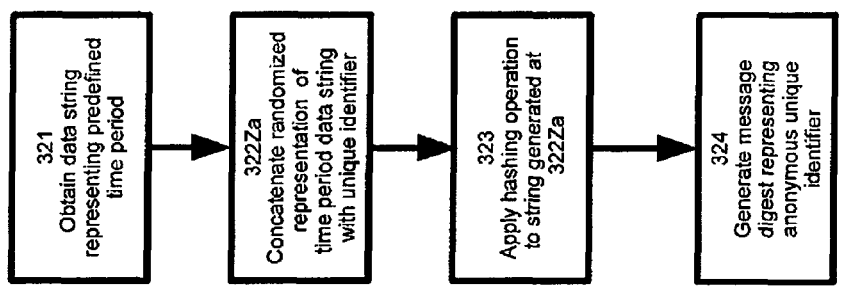
FIG. 13 is a flow-chart depicting an alternative to the method of FIG. 6.

As still further variation, FIG. 13 shows a version of method 320Z that can be used instead of method 320Za in from FIG. 6. In method 320Za, block 322Za substitutes block 322 from method 320Za. In block 322Za, a randomized representation of the time period data string is used instead of the time period itself, thereby providing even further anonymity. At block 322Za the numerical string representing the predefined time period is in the form of a random number. The random number, itself, is maintained in a lookup table by engine 58, so that only engine 58 will have a record of the exact random number used. Thus, when the random number and unique identifier are concatenated at block 322Za and hashed at block 323, the resulting anonymous identifier has greater anonymity, yet the original unique identifier can still be recovered by engine 58.

Combinations, subsets and variations of all embodiments herein are contemplated.

The invention claimed is:

1. A method for modifying requests from a client device for a server comprising:
   receiving a request from said client device for said server;
   receiving a unique identifier for said client device;
   generating a representation of said unique identifier by:
      obtaining a numerical string representing a current date;
      concatenating said numerical string with said unique identifier; and
      applying a hashing operation to said unique identifier and said numerical string;
   forwarding said representation and said request to said server;
   receiving a plurality of further requests from said client device; and
   generating and forwarding further representations of said unique identifier for each of said further requests using further current dates, without storing said current date or said further current dates, such that when said further current dates are equal to said current date, said further representations are equal to said representation, and when said further current dates are different from said current date, said further representations are different from said representation.

2. The method of claim 1 wherein said representation is anonymous such that said unique identifier cannot be recovered from said representation.

3. The method of claim 2 wherein applying a hashing operation comprises performing said hashing operation on said concatenated unique identifier and numerical string to produce a message digest; said representation incorporating said message digest.

4. The method of claim 1 wherein said numerical string identifies one or more of a current month, a current week, a current day, a current half-day, and a current hour.

5. The method of claim 4 wherein said numerical string identifies the current year, the current month and the current day.

6. The method of claim 1 wherein the numerical string is a random number that is associated with the current date.

7. The method of claim 1 wherein said request is for a web-page generated from a web-browser on said client device.

8. The method of claim 7 wherein said request is generated by selecting a link on one web-page hosted on an additional server other than said server.

9. The method of claim 1 further comprising:
   prior to said generating, receiving an indication from said client device whether said client device request desires anonymity;
   if said indication indicates said client device does not desire anonymity, then as part of said generating, setting said representation to equal said unique identifier such that during said forwarding said request and said unique identifier are forwarded to said server.

10. A computer comprising a processor which connects to a persistent storage device and a volatile storage device via a bus;
   said processor also connected to a network interface for communicating with a client device;
   said processor configured to receive a request of a client device for a server;
   said processor further configured to receive a unique identifier of said client device;
   said processor further configured to generate a representation of said unique identifier by:
      obtaining a numerical string representing a current date;

concatenating said numerical string with said unique identifier; and
applying a hashing operation to said unique identifier and said numerical string;
said processor further configured to forward said request and said representation for further processing by said server; and
said processor further configured to receive a plurality of further requests from said client device, and to generate and forward further representations of said unique identifier for each of said further requests using further current dates, without storing said current date or said further current dates, such that when said further current dates are equal to said current date, said further representations are equal to said representation, and when said further current dates are different from said current date, said further representations are different from said representation.

11. The computer of claim 10 wherein said representation is anonymous such that said unique identifier cannot be recovered from said representation.

12. The computer of claim 11 wherein applying a hashing operation comprises performing said hashing operation on said unique identifier and said numerical string to produce a message digest; said representation incorporating said message digest.

13. The computer of claim 10 wherein said numerical string identifies one or more of a current month, a current week, a current day, a current half-day, and a current hour.

14. The computer of claim 13 wherein said numerical string identifies the current year, the current month and the current day.

15. The computer of claim 10 wherein said request is for a web-page generated from a web-browser on said client device.

16. The computer of claim 10 wherein said request is generated by selecting a link on one web-page hosted on an additional server other than said server.

17. The computer of claim 10 wherein said request is for a web-service.

18. The computer of claim 10 wherein said computer is independent of said client and said server.

19. A non-transitory computer readable medium storing a plurality of programming instructions; said programming instructions configured to execute on a computer; said programming instructions configured to render a processor on said computer operable to:
receive a request from said client device for said server;
receive a unique identifier for said client device;
generate a representation of said unique identifier by:
obtaining a numerical string representing a current date;
concatenating said numerical string with said unique identifier; and
applying a hashing operation to said unique identifier and said numerical string;
forward said representation and said request to said server;
receive a plurality of further requests from said client device; and
generate and forward further representations of said unique identifier for each of said further requests using further current dates, without storing said current date or said further current dates, such that when said further current dates are equal to said current date, said further representations are equal to said representation, and when said further current dates are different from said current date, said further representations are different from said representation.

20. A method of processing requests comprising:
receiving a request and a unique identifier from a client device;
generating a representation of said unique identifier by:
obtaining a numerical string representing a current date;
concatenating said numerical string with said unique identifier; and
applying a hashing operation to said unique identifier and said numerical string;
recording said representation and said request;
receiving a plurality of further requests from said client device; and
generating and recording further representations of said unique identifier for each of said further requests using further current dates, without storing said current date or said further current dates, such that when said further current dates are equal to said current date, said further representations are equal to said representation, and when said further current dates are different from said current date, said further representations are different from said representation.

21. The method of claim 20 further comprising:
if said recording step is performed less than a predetermined number of times, generating a charge associated with said request.

22. A method of processing requests comprising:
receiving a request for content and a unique identifier at a service provider engine from a client device;
generating a representation of said unique identifier at said service provider engine by:
obtaining a numerical string representing a current date;
concatenating said numerical string with said unique identifier; and
applying a hashing operation to said unique identifier and said numerical string;
forwarding said request for content and said representation to a first content server; said content being hosted on an additional content server other than said first content server;
recording said representation and said request for content at said first content server; and
receiving a plurality of further requests at said service provider engine from said client device; and
generating and forwarding further representations of said unique identifier for each of said further requests using further current dates, without storing said current date or said further current dates, such that when said further current dates are equal to said current date, said further representations are equal to said representation, and when said further current dates are different from said current date, said further representations are different from said representation.

23. The method of claim 22 further comprising:
if said recording step is performed less than a predetermined number of times, generating a charge to an entity hosting said content associated with said request.

24. The method of claim 22 further comprising:
returning a redirect address to said service provider engine from said first content server; said redirect address including an identifier for said content.

25. The method of claim 24 further comprising:
returning said redirect address to said client device from said service provider engine.

26. The method of claim 25 further comprising:
using said redirect address to connect with said additional content server.

* * * * *